United States Patent [19]
Lane

[11] 3,763,756
[45] Oct. 9, 1973

[54] LIGHT-WEIGHT REFLEX OPERATOR ASSEMBLY

[75] Inventor: William P. Lane, Taunton, Mass.

[73] Assignee: Polaroid Corporation, Cambridge, Mass.

[22] Filed: Apr. 24, 1972

[21] Appl. No.: 246,702

[52] U.S. Cl. .................................. 95/42, 350/310
[51] Int. Cl. ..................... G03b 17/17, G03b 19/12
[58] Field of Search .......................... 95/42; 350/310

[56] References Cited
UNITED STATES PATENTS

| | | | |
|---|---|---|---|
| 3,644,022 | 2/1972 | Jagdt et al. | 350/310 |
| 3,453,041 | 7/1969 | Rantsch | 350/310 |
| 2,988,959 | 6/1961 | Pelkey et al. | 350/310 X |
| 2,609,068 | 9/1952 | Pajak | 161/68 |

Primary Examiner—Samuel S. Matthews
Assistant Examiner—Richard A. Wintercorn
Attorney—Michael Bard

[57] ABSTRACT

The subject invention provides a reflex camera having a specular reflecting surface within the optical path to the film plane. A novel light-weight but structurally stiff operator mechanism positions a viewing surface closely proximate the film plane for viewing-focusing purposes. In a subsequent exposure mode configuration, the operator mechanism positions a reflective surface within the optical path in a position causing a coincidence of a focal plane with the film plane. A film unit stored in the camera is covered by the operator mechanism during the viewing-focusing mode to prevent any illumination from reaching the film unit. When the shutter operates, the operator mechanism pivots about one end to uncover the film unit for an exposure by allowing illumination from a subject to reach the film unit.

21 Claims, 4 Drawing Figures

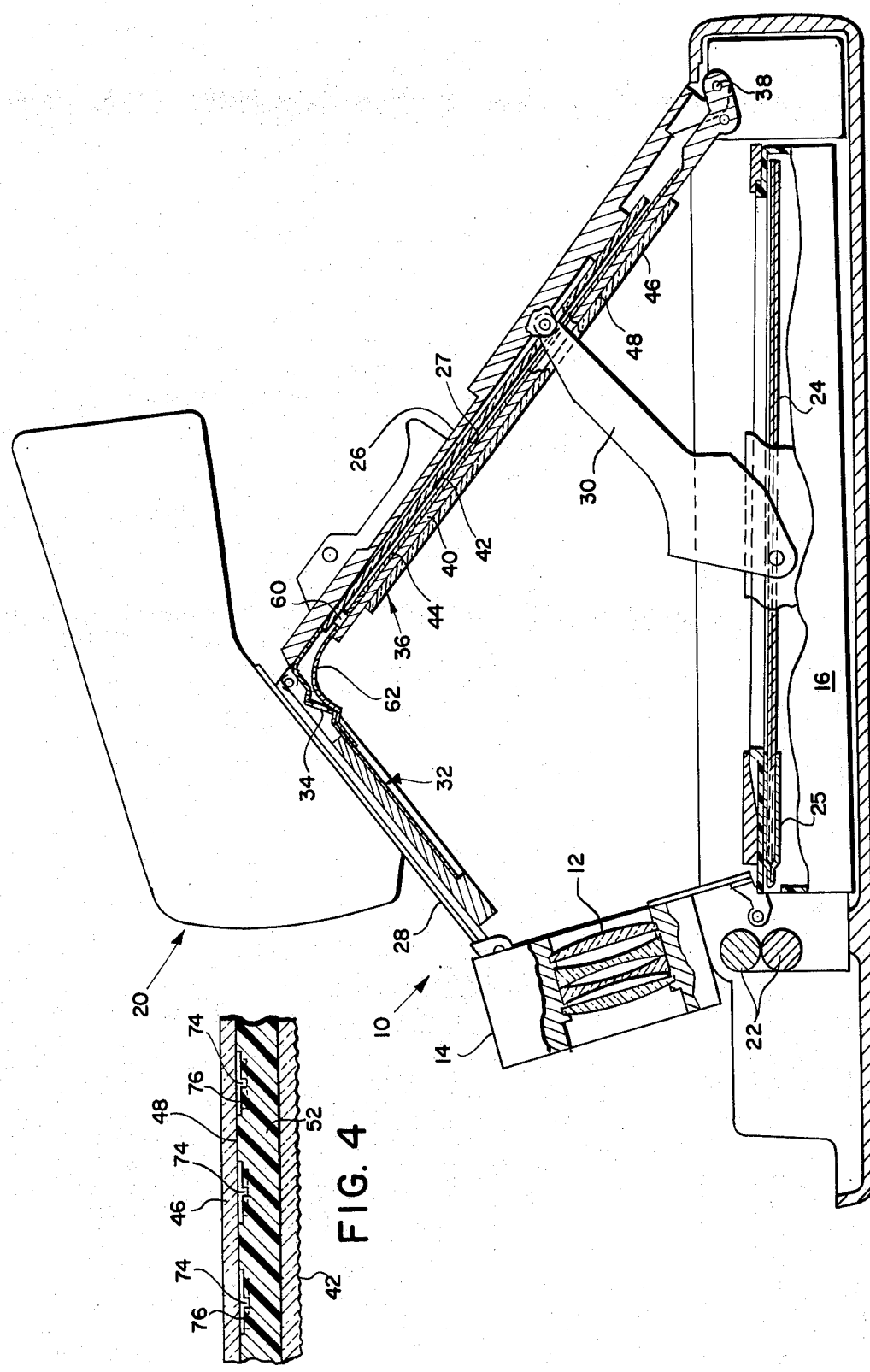

LIGHT-WEIGHT REFLEX OPERATOR ASSEMBLY

BACKGROUND OF THE INVENTION

The present invention relates generally to photographic cameras of the reflex type and, more particularly, to a reflex camera in which a specular reflecting surface is moved into the optical path of a taking lens when the camera is caused to assume an exposure configuration and in which a reflective viewing screen is positioned proximate the film plane when the camera is caused to assume a viewing-focusing configuration.

Certain photographic film materials are structured to directly record a positive image of any subject properly imaged and exposed thereupon. Exemplary of such materials are the film units described in U. S. Pat. No. 3,415,644, entitled "Novel Photographic Products and Processes" and issued to E. H. Land on Dec. 10, 1968. Film units of this type are intended for use within the above-noted self-processing photographic cameras and incorporate all of the materials necessary to produce a positive photographic print immediately following their exposure. While being of a somewhat complex chemical makeup, the film units are physically structured to include a planar photosensitive element in laminar combination with a transparent image-receiving element. Specially packaged processing units are additionally included within the units.

To image properly through a lens system upon the above-described film units, it is necessary that one or an odd number of specular surfaces be incorporated within the optical path extending from the camera lens to the exposure plane of the film unit. Although the film units are configured to provide a desirably large film format, certain improved photographic camera designs have taken advantage of the requisite specular surface to achieve somewhat compact overall camera structures.

Improved photographic cameras as above described are intended to perform in fully automated fashion while being structured so thinly and compactly as to be carried conveniently in the pocket of a garment. Typically, these improved cameras incorporate an optimum viewing and focusing system together with fully automatic exposure control and motorized automatic film processing. In effect, the fully automatic camera represents an instrumentality incorporating a complex, multi-step process control system.

For purposes providing optimum viewing performance as well as structural compactness, the automated camera preferably utilizes a form of single lens reflex viewing. As described and claimed in a copending application for Letters Patent by E. H. Land, entitled "Reflex Camera," filed Apr. 15, 1970, Ser. No. 28,567, and commonly assigned herewith, such reflex cameras normally assume a viewing-focusing mode configuration in which their exposure plane is isolated from scene illumination by a flat, movable operator or mirror and viewing surface assembly. In a viewing mode configuration, the operator assembly serves a function of providing a surface upon which a scene, in reflex fashion, may be framed and focused in preparation for the photographic exposure. In accordance with a modified single lens optical operation, depression of a start button on the camera commences a multi-step control causing its components to assume an orientation securing an exposure chamber by closing its shutter through an electromagnetic drive system. When this chamber is secured, the camera is caused to commence an exposure mode operation in which the earlier-described operator assembly is released for movement via a spring drive to uncover the exposure plane and provide a revised reflex optical path for subsequent exposure of the previously imaged scene.

As an exposure mode configuration is achieved, the automatic exposure control sub-system of the camera cycles through a regulated exposure interval following which the shutter again closes to secure the exposure chamber. The control system of the camera is then called upon to cock the operator assembly by driving it via an electrical motor into its viewing mode configuration. Prior to termination of the photographic cycle, an exposed photosensitive film unit is automatically removed from its position at the exposure plane and drawn through a motor-driven processing station. When the operator assembly has been cocked and returned to its orientation covering the exposure plane, the shutter is again opened to its maximum extent and the camera is ready for its next succeeding photographic cycle.

As mentioned previously, the operator assembly is cocked by driving it via an electrical motor into its viewing mode configuration. As a consequence, the operator assembly drive system will usually require an override form of drive linkage to assure proper seating in its cocked position.

Certain prior art photographic cameras such as described in copending application, Ser. No. 103,219, filed Dec. 31, 1970, and commonly assigned herewith, incorporate a lost-motion connection within the drive system for moving the operator assembly between the exposure mode position and the viewing-focusing mode position. Movement of the operator assembly between these positions is accomplished through a system incorporating a four-bar linkage and a drive spring. The system is configured to minimize the time required for moving the operator assembly to its exposure mode position whilst also minimizing the elastic rebound of the operator assembly when it reaches its exposure mode position. If the operator assembly encounters any interference during its motor-driven movement between the exposure and viewing mode positions, the override spring will allow the motor to finish its normal return cycle. The energy from the motor will be transferred to and stored in the override spring until such time as the interference is removed. When the interference is removed, the override spring returns the operator assembly to its viewing position and attendant damage to the motor will be alleviated.

In view of the rapid movement of the operator assembly and further in view of its functioning as a component of the optical system of the camera, it should be readily apparent that it is desirable that the operator assembly be extremely light in weight and have sufficient structural rigidity to support the specular reflex mirror and reflective viewing screens at an appropriate planar position.

SUMMARY OF THE INVENTION

The subject invention includes a camera of the single lens reflex type having a planar wall which fixedly secures a specular member interposed between a lens and a film plane. The invention further includes an operator assembly incorporating a reflex member having opposed reflecting surfaces. One of these reflecting surfaces functions to reflect the image of a subject to the film plane and the other of these reflecting surfaces functions as a reflective viewing screen.

The operator assembly includes a light-weight carrier member, which is of latticework structure, having opposed planar faces one of which is relatively smooth and the other of which is provided with a series of cruciform-shape recesses which function to vent the interstices of the latticework structure. A specular reflex mirror is secured to the smooth surface of the carrier assembly via a suitable adhesive and an extremely thin reflective viewing screen is secured to the other face of said carrier assembly with the same adhesive material.

The smooth surface of the carrier assembly is configured to provide a maximum contact surface for bonding to the reflective viewing screen and to maximize the contact area at points of greatest stress concentration. The opposite face of the carrier assembly is similarly configured to maximize the available contact surface for the specular reflex mirror and accomplishes this in part by forming the face of the latticework structure such that the intersections of the grid members comprising the latticework structure lie at or below the plane of the face of the carrier assembly to which the specular reflex mirror is attached. Additionally, means are provided for preventing any undesired reflection from the adhesive bonding agent employed.

The operator assembly is mounted for pivotal movement between a first position whereat the viewing screen is positioned at a focal plane overlying and proximate the film or exposure plane, and a second position whereat the reflecting surface opposite the viewing surface is positioned overlying the fixed specular surface so as to redirect an image toward said film or exposure plane. Thus, in the first position said reflex member functions as a component of the camera's viewing system; and in the second position it functions as part of the exposure system.

Spring drive means are employed for moving the operator assembly from its viewing mode position to its exposure mode position.

In view of the foregoing, it is an object of the subject invention to provide a photographic camera of the single lens variety and incorporating a reflex member which functions as a component of both the viewing and exposure systems of said camera and wherein operation may be shifted from a viewing mode to an exposure mode and back to said viewing mode whilst minimizing the interruption of the user's field of view and with a maximization of mechanical efficiency.

Another object of the present invention is to provide a light-weight carrier assembly for a reflex operator assembly such that movement of said reflex operator assembly from a first position to a second position may be accomplished whilst preventing undesired oscillation or "bounce" of said operator assembly upon reaching said second position.

Still another object of the instant invention is to provide a light-weight and relatively stiff carrier member for securing a specular reflex mirror and a reflective viewing screen in spaced parallel relation whilst minimizing any warpage or distortion of said reflective viewing screen from a planar configuration.

A further object of this invention is to provide a reflex photographic apparatus including an operator assembly movable between viewing and exposure mode positions; said operator assembly incorporating a latticework carrier assembly having opposed generally planar surfaces for securing a specular reflex member and a reflective viewing screen in opposed spaced parallel relation.

A still further object of the present invention resides in the provision of an extremely light-weight and structurally stiff operator assembly for a reflex camera and incorporating a latticework carrier member for supporting a reflective viewing screen and a specular reflex member in opposed relation; said carrier assembly incorporating means for venting the interstices formed by its latticework structure and said viewing screen and specular mirror.

DESCRIPTION OF THE DRAWINGS

Other objects and many of the attendant advantages of the instant invention will become better appreciated and said invention will become clearly understood by reference to the following detailed description when considered in conjunction with the accompanying drawings illustrating one embodiment of the subject invention, wherein:

FIG. 1 provides a simplified cross-section of a camera including the subject invention;

FIG. 4 provides a cross-section of a portion of the carrier of FIG. 3.

DETAILED DESCRIPTION OF THE INVENTION

Figure 3:
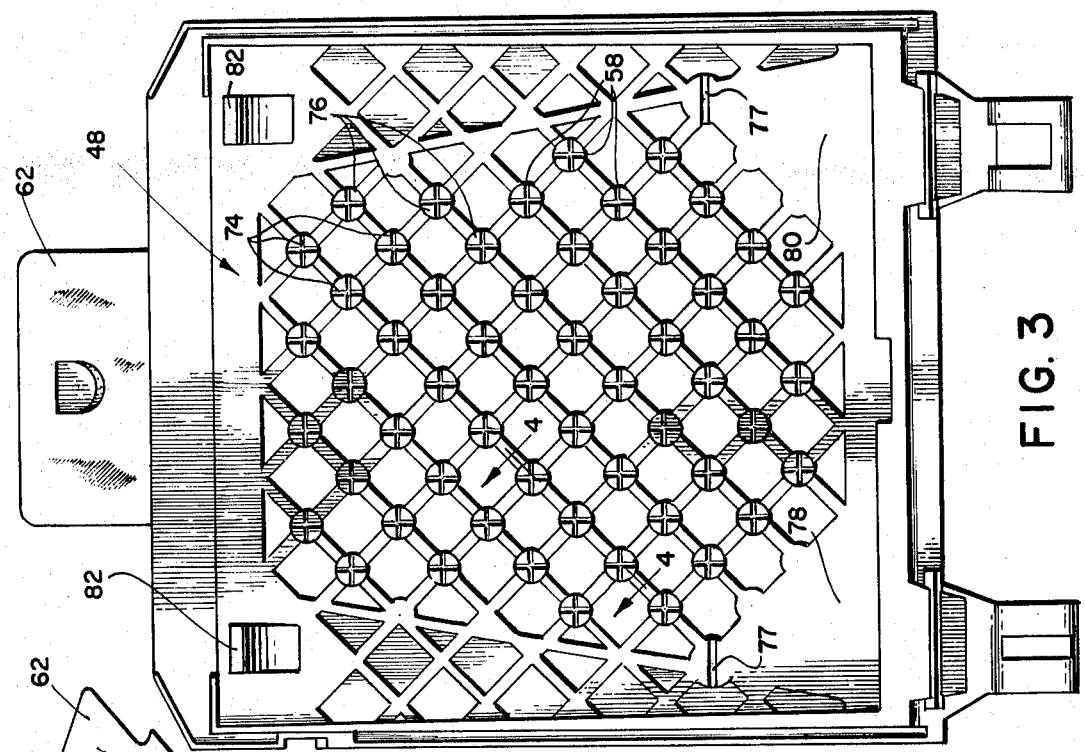
FIG. 3 provides a bottom plan of the novel carrier of the subject invention.

Referring to the drawings in more detail and, more particularly to FIG. 1, a reflex camera for which the present invention is especially suited is illustrated generally at 10. The reflex camera 10 is representative of the type of reflex camera more fully described in copending application Ser. No. 28,567, aforesaid. The reflex camera 10 is provided with an objective lens assembly 12 which is mounted in a front housing 14. The camera 10 is provided with means for receiving a film cassette 16 within the base 18 of the photographic camera 10 and a viewfinder assembly illustrated generally at 20 by means of which a photographer can aim and focus the reflex camera 10. The reflex camera 10 further includes a pair of processing rollers 22 which receive a self-processing film unit 24 as it emerges from the cassette 16, rupture a chemical pod 25 and discharge the film unit 24 from within the camera 10, in a manner well-known in the art.

The front housing 14, the viewfinder 20, a long cover 26, and a short cover 28, are articulated such that they can be erected to form an exposure chamber over the base 18 as illustrated in FIG. 1. The articulation of the long cover 26 and the short cover 28 permits them to fold together with the base 18 to form a compact unit for storage as in the pocket of a garment. A stationary reflex viewing mirror 27 is secured to the underside of the long cover 26 and reflects the image formed by the objective lens 12 toward a viewing plane of the camera 10 proximate the film unit 24. The stationary reflex viewing mirror 27 also reflects light emanating from the image formed in the viewing plane into the viewfinder 20. A arm 30 maintains the articulated members erect to form the exposure chamber. To fold the camera 10 for storage, the photographer pushes on the arm 30 to unlatch it, permitting the articulated members 26 and 28 to fold flat to form a compact unit, as aforesaid.

Within the exposure chamber, partially defined by the articulated members 26 and 28, is a flexible bellows, a portion of which is illustrated at 32, which excludes light from the exposure chamber except as admitted by the objective lens assembly 12 during an exposure. An aperture 34 is disposed in the upper portion of the bellows 32 and functions to permit light in the exposure chamber to enter the viewfinder 20. The aperture 34 must be closed during a photographic exposure to prevent stray light entering the viewfinder 20 from reaching the film unit 24, and such closure is effected in accordance with the teachings of copending application Ser. No. 151,255, filed June 9, 1971, by William T. Plummer, and entitled "Light Seal for a Reflex Camera Viewfinder" (Case 4,297).

A genrally planar operator assembly 36 is secured within the exposure chamber of the camera 10 for pivotal movement about an axle 38. The operator assembly 36 includes a generally planar carrier assembly 40 formed of a material opaque to light. A viewing surface 42 is secured to the upper face 44 of the carrier assembly 40 and is generally similar to the viewing surface which is the subject of copending application Ser. No. 141,253, filed May 7, 1971, by William T. Plummer, and entitled "Improved Reflective Imaging Apparatus." A specular reflex mirror 46 is secured to the lower face 48 of the carrier assembly 40 such that the viewing surface 42, the carrier assembly 40, and the specular reflex mirror 46 form a sandwich-like structure. Typically, the viewing surface 42 and the specular reflex mirror 46 may be bonded to their respective faces of the carrier assembly 40 as by an adhesive structure (not shown) comprising a clear Mylar sheet whose opposite faces have been coated with an adhesive opaque to light such as Fasson 333A adhesive. A Mylar sheet with the opaque adhesive on both of its surfaces is suitably positioned between the viewing surface 42 and the face 44 of the carrier assembly 40 and said veiwing surface 42 is bonded to said upper face 44 through the application of appropriate compressive pressure. Similarly, an adhesive coated sheet of Mylar, as aforesaid, is interposed between the specular reflex mirror and the face 48 of the carrier assembly 40 and said reflex mirror is bonded to said face 40 by a similar application of compressive pressure.

Incorporating a highly refined viewing and focusing system, the photographic camera 10 operates in a modified reflex fashion (as mentioned previously herein) being convertible between viewing and exposure operational modes by movement of the operator assembly 36. In the viewing-focusing mode (not shown), the operator assembly 36 is pivoted about the axle 38 to its extreme counterclockwise position capping the cassette 16 and thereby covering the film unit 24 within said cassette 16. In the viewing-focusing mode position of said operator assembly 36, the carrier assembly 40 positions the viewing surface 42 in the viewing plane of the camera 10 so that the objective lens assembly 12 may focus the image of a subject onto said viewing surface 42 via the reflex viewing mirror 27. The carrier assembly 40 is configured to nest over the film cassette 16 (when in the viewing-focusing mode) in such a manner as to form a labyrinth seal therewith and prevent illumination from reaching the film unit 24.

After the image of a subject is properly focused on the viewing surface 42, an exposure may be initiated in a manner more fully described in said application Ser. No. 28,567 (Case 4,081) whereupon the operator assembly 36 is propelled rapidly clockwise about the axle 38 toward the reflex viewing mirror 27 to assume its exposure mode configuration, as illustrated in FIG. 1, with the specular reflex mirror 46 disposed over the stationary reflex viewing mirror 27. In the exposure mode configuration, an image of the subject is focused onto the film unit 24 by the objective lens assembly 12 via the specular reflex mirror 46.

Referring again to FIG. 2, it can be seen that while the viewing surface 42 is of rectangular format and of approximately the same size as the face 44 of the carrier assembly 40, the specular reflex mirror 46 is of generally trapezoidal shape with the longer of its two parallel edges positioned proximate the pivoted end portion of the carrier assembly 40. The trapezoidal configuration of the specular reflex mirror 40 is a result of the differential optical path length between the objective lens assembly 12 and the various portions of the specular reflex mirror 46 as readily apparent in the exposure mode configuration illustrated in FIG. 1.

Figure 2:
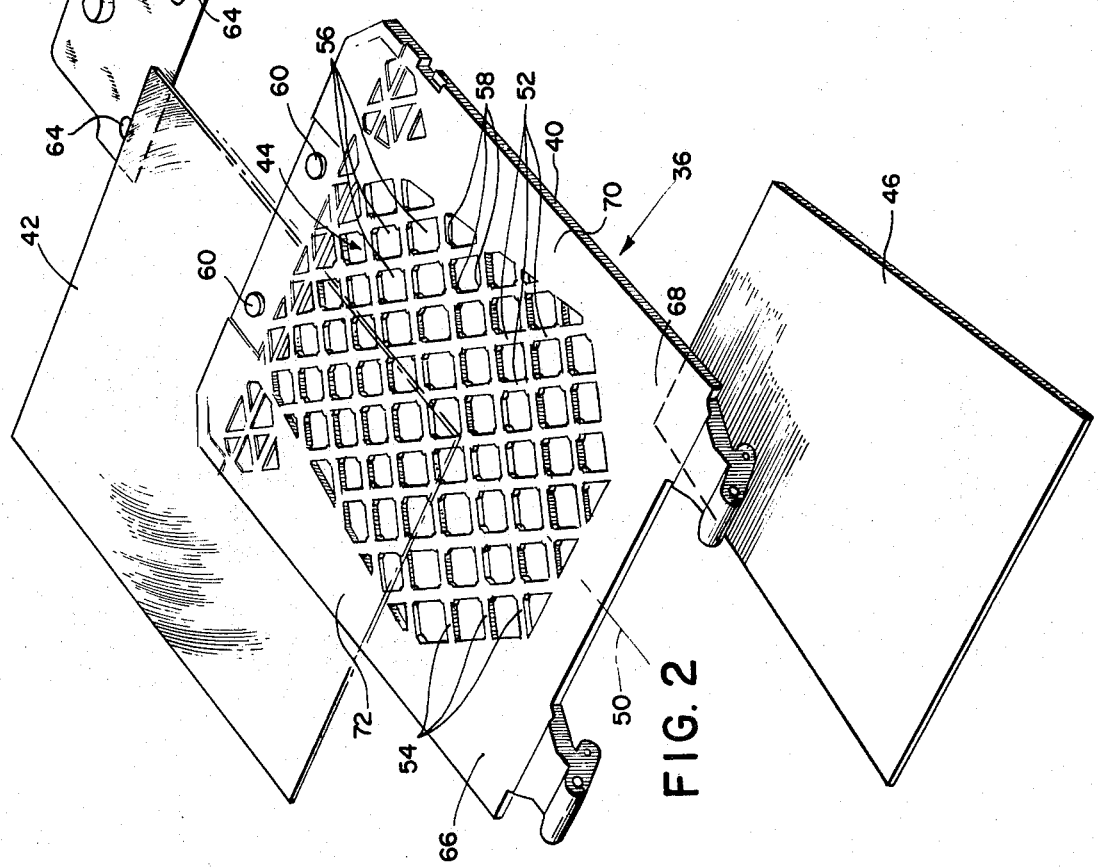
FIG. 2 provides a simplified exploded perspective of the novel operator assembly of the subject invention.

As best seen in FIGS. 2 and 3, the carrier assembly 40 is of generally rectangular shape and is symmetrical with respect to a longitudinal axis 50. The carrier assembly 40 is of generally latticework construction and includes a plurality of rib portions 52 which extend at an angle of approxiamtely 45° with the longitudinal axis 50 and which intersect a plurality of similar rib portions 54 which lie perpendicular to the rib portions 52 to define a plurality of interstices or apertures 56 of generally diamond shape. The orientation of the rib portions 52 and the rib portions 54 serve to provide maximum stiffness for resisting any bending moment about an axis transverse the longitudinal axis 50. The rib portions 52 and 54 are so configured as to define a plurality of generally cylindrical segments 58 at their intersections.

A pair of aligned spaced tits 60 are disposed on the edge portion of the face 44 remote from the axle 38 and function to butt up against the stationary reflex viewing mirror 27 so as to hold the operator assembly 36 in predetermined spaced relation to said stationary reflex viewing mirror 27 in the exposure mode configuration. A resilient flap 62 is provided with a pair of aligned spaced apertures 64 and is secured to one end portion of the carrier 40 such that the tits 60 are received within and extend through the apertures 64. The resilient flap 62 functions to prevent light from entering the reflex camera 10 through the viewfinder assembly 20 and aperture 34 during a photographic exposure, as more fully explained in copending application Ser. No. 151,255, aforesaid.

Because the stresses tending to detach the viewing surface 42 from the carrier assembly 40 (during the operation of the photographic camera 10) have been found to be greatest near the corners of said carrier assembly 40 proximate the axle 38, the corner face portions 66 and 68 of the face 44 have been configured as smooth continuous surfaces to permit maximum adhesion between the carrier 40 and the viewing surface 42 at those locations. Also, because of the differential size between the viewing surface 42 and the specular reflex mirror 46, the side portions 70 and 72 of the upper face 44 have been made smooth and opaque to prevent any spurious reflection of light from the adhesive material used to bond the viewing surace 42 to the face 44 from interferring with a photographic exposure when th operator assembly 36 is in an exposure mode configuration.

The latticework configuration of the carrier assembly 40 permits it to be extremely light in weight and structurally stiff, but it will be apparent that the sandwich-like structure formed by said carrier assembly 40, the viewing surface 42 and specular reflex mirror 46 permit the interstices 56 to act as tiny gas trapping chambers. Inasmuch as the viewing surface 42 is extremely thin (on the order of 10 mils.), it is evident that any gases trapped in said interstices 56 might cause dimpling, bubbling, or other undesirable distortion of said viewing surface 42. Accordingly, as best seen in FIG. 3, a plurality of cruciform-shape vent slots are each disposed on the face 76 of one of the cylindrical segments 58 disposed along the lower face 48 of the carrier assembly 40. The cruciform-shape vent slots 74 communicate the interstices 56 with one another and the entire structure is vented to the ambient atmosphere via a pair of vent slots 77.

As best seen in FIG. 4, each of the faces 76 is disposed at or recessed from the plane of the lower face 48 as defined by the rib portions 52 and 54. By recessing the faces 76 of the cylindrical segments 58, a stronger bond is assured between the specular reflex mirror 46 and the carrier assembly 40. If the faces 76 were allowed to extend outward of the plane of the lower face 48, then bonding between the reflex mirror 46 and the carrier assembly 40 would take place along the relatively small surface area afforded by the faces 76 rather than along the much larger surface area afforded by the rib portions 52 and 54.

Further, it will be noted that the vents 74 and 77 are provided on the lower face 48 but not on the upper face 44 of the carrier assembly 40. Such positioning of the vents 74 and 77 is necessary because the thinness and flexibility of the viewing surface 42 might permit the adhesive bonding material to obstruct the vents 74 and 77 if they were provided on the face 44 which carries the viewing surface 42.

Referring again to FIG. 3, it is seen that the face 48 of the carrier 40 is provided with continuous corner face portions 78 and 80 which are analogous to the corner face portions 66 and 68 of the upper face 44 in that they insure a strong bond of the specular reflex mirror 46 to the carrier assembly 40 at the points of greatest stress concentration. A pair of aligned, spaced guide surfaces 82 are recessed in the edge portion of the lower face 48 remote from the axle 38 which cooperate (as more fully described in the copending application filed June 7, 1971, by Charles DeJesus et al., and entitled "Combination Flare Baffle and Light Seal for a Reflex Camera" (Case 4,298)), with a movable baffle (not shown) inside the reflex camera 10 to protect the film unit 24 from stray light during a photographic exposure and to help prevent fogging of the film unit 24 stored within the camera during focusing or during storage of the camera 10.

In considering the foregoing, it should be noted that in cameras of the type described, it is quite important to minimize the possibility of certain dynamic effects, stemming from the rapid upward rotation of the operator assembly 36, which might adversely affect the quality of photographs produced. vibration and bouncing of the specular reflex mirror 46, which is carried on the carrier assembly 40, causes the image it reflects to move about on the film unit 24 creating a blurred photograph. This occurs in two ways: the image on the film unit 24 moves about due to changes in the angle of incidence of the light at the specular reflex mirror 46; and, the image goes in and out of focus because the bouncing of said specular reflex mirror 46 alters the optical distance between the objective lens assembly 12 and the film unit 24. It is to be understood that the reflection at the specular reflex mirror 46 magnifies the dynamic behavior of the mirror as it, in turn, affects the image on the film unit 24. Further, too great an impact of the operator assmebly 36 at its uppermost point might jolt the camera 10, throwing off the user's aim. It has been found, however, that a structurally stiff and extremely light-weight carrier assembly 40 such as described hereinabove is able to allow the operator assembly 36 to move very rapidly from the viewing-focusing mode configuration to the exposure mode configuration whilst minimizing the impact of the operator assembly 36 at its uppermost point and minimizing vibration and bouncing of the specular reflex mirror 46. Accordingly, a significant amelioration of any undesirable blurring of the resultant photograph may be effected.

It can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is, therefore, to be understood that within the scope of the appended claims, the instant invention may be practised in a manner otherwise than is specifically described herein.

What is claimed is:

1. In combination with a reflex photographic camera of the type having operator means movable between a viewing position and an exposure position; a carrier assembly of latticework configuration defining a plurality of spaced interstices, including:

a generally planar first face;
 a flexible reflective viewing screen adhesively bonded to said first face;
 a generally planar second face;
 a specular reflex mirror adhesively bonded to said second face such that said latticework configuration is sandwiched between said viewing screen and said specular reflex mirror; and
 means communicating said interstices with each other and with the ambient atmosphere.

2. The invention pursuant to claim 1, wherein said latticework configuration includes a first plurality of ribs or the like extending in one direction and a second plurality of ribs or the like extending in a different direction.

3. The invention as recited in claim 2, wherein said first and second pluralities of ribs or the like intersect to define said plurality of interstices.

4. The invention as set forth in claim 3, wherein said communicating means includes a plurality of vent passages located at said intersections.

5. The invention in accordance with claim 4, wherein said vents are located on said second face.

6. The invention in conformance with claim 5, wherein said vents comprise a plurality of cruciform-shape slots.

7. The invention as delineated in claim 6, wherein the intersections of said ribs or the like are recessed from the plane of said second face.

8. The invention as stated in claim 5, wherein the intersections of said ribs or the like do not extend above the plane of said second face.

9. The invention as set forth in claim 8, further including means for preventing light directed toward said second face from reflecting from said adhesive bond between said viewing screen and said first face.

10. The invention of claim 9, wherein said reflection preventing means comprises a plurality of opaque sections disposed along said first surface and coplanar with said first surface.

11. The invention as related in claim 10, wherein said opaque sections are disposed about said first surface outward of the boundary of said specular reflex mirror.

12. Operator means for use with a reflex photographic camera and movable between a viewing position and an exposure position, including:
 a generally planar carrier assembly having first and second faces and a longitudinal axis;
 a first plurality of ribs extending in one direction;
 a second plurality of ribs extending in a direction other than said one direction and intersecting said first plurality of ribs to define a plurality of discrete apertures;
 vent means for communicating said apertures with each other and with the ambient atmosphere; and
 a flexible viewing screen adhesively bonded to said first face and a specular reflex mirror adhesively bonded to said second face, whereby said ribs and said apertures will be effectively sandwiched between said viewing screen and said mirror.

13. The invention according to claim 12, wherein said viewing screen comprises a surface area greater than that of said mirror.

14. The invention as set out in claim 13, further including means for preventing light directed toward said second face from reflecting from said adhesive bond between said viewing screen and said first face.

15. The invention as set forth in claim 14, wherein said reflection preventing means comprises plural opaque sections disposed along and coplanar with said first face.

16. The invention pursuant to claim 15, wherein said opaque sections are disposed outward of the boundary of said mirror.

17. A generally planar light-weight carrier assembly of latticework configuration defined by a plurality of intersecting ribs supporting a flexible viewing screen on one face thereof and a relatively rigid mirror on the opposite face thereof; and including a plurality of vents positioned along said opposite face.

18. The invention as delineated in claim 17, wherein said latticework configuration comprises a plurality of discrete apertures and said vents are disposed to communicate between said apertures.

19. The invention according to claim 18, wherein said intersections do not extend above the plane of said opposite face and said vents are located at said intersections.

20. The invention pursuant to claim 19, wherein said carrier assembly is provided with means for securing it in spaced relation to a planar specular surface.

21. The invention as recited in claim 20, wherein said securing means comprises a plurality of tits or the like positioned along one edge portion of said one face.

* * * * *